(12) United States Patent
Andreas-Schott et al.

(10) Patent No.: US 7,807,316 B2
(45) Date of Patent: Oct. 5, 2010

(54) FUEL CELL STACK COMPRESSION RETENTION SYSTEM WITH EXTERNAL SPRINGS

(75) Inventors: Benno Andreas-Schott, Pittsford, NY (US); Gerald W. Fly, Geneseo, NY (US); Jeffrey A. Rock, Fairport, NY (US); Ian R. Jermy, LeRoy, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 939 days.

(21) Appl. No.: 11/591,377

(22) Filed: Nov. 1, 2006

(65) Prior Publication Data
US 2008/0102345 A1 May 1, 2008

(51) Int. Cl.
*H01M 8/02* (2006.01)
(52) U.S. Cl. ................................ 429/511; 429/452
(58) Field of Classification Search .............. 429/12–46
See application file for complete search history.

(56) References Cited

U.S. PATENT DOCUMENTS

| | | | |
|---|---|---|---|
| 4,728,585 A * | 3/1988 | Briggs | 429/36 |
| 5,484,666 A | 1/1996 | Gibb et al. | |
| 6,284,399 B1 | 9/2001 | Oko et al. | |
| 6,663,996 B2 * | 12/2003 | Gibb et al. | 429/37 |
| 6,864,005 B2 | 3/2005 | Mossman | |
| 7,045,245 B2 | 5/2006 | Rock | |
| 7,344,797 B2 * | 3/2008 | Rock | 429/37 |
| 2003/0104267 A1 * | 6/2003 | Haridoss et al. | 429/44 |
| 2003/0194596 A1 | 10/2003 | Ye et al. | |
| 2003/0203269 A1 * | 10/2003 | Rock | 429/37 |
| 2004/0121216 A1 * | 6/2004 | Blanchet | 429/37 |
| 2005/0158607 A1 | 7/2005 | Vyas et al. | |
| 2006/0188771 A1 * | 8/2006 | Allen et al. | 429/37 |
| 2008/0305380 A1 * | 12/2008 | Andreas-Schott et al. | 429/34 |
| 2008/0311457 A1 * | 12/2008 | Andreas-Schott et al. | 429/34 |

* cited by examiner

*Primary Examiner*—Dah-Wei D Yuan
*Assistant Examiner*—Stephan Essex
(74) *Attorney, Agent, or Firm*—Fraser Clemens Martin & Miller LLC; J. Douglas Miller

(57) ABSTRACT

A fuel cell system is provided including a fuel cell stack having a first end and second end; an upper end unit adjacent the first end of the fuel cell stack; a lower end unit adjacent the second end of the fuel cell stack; and a compression retention system disposed external to the fuel cell stack. The compression retention system includes at least one restraining member extending from the upper end unit to the lower end unit, fastening means disposed at opposite ends of the at least one restraining member, and compressive means interposed between at least one of the fastening means and the end units; wherein the fastening means and the compressive means urge the upper end unit toward the lower end unit, thereby applying compressive force to the fuel cell stack. Also provided is a method for assembling the fuel cell system.

10 Claims, 7 Drawing Sheets

FUEL CELL STACK COMPRESSION RETENTION SYSTEM WITH EXTERNAL SPRINGS

FIELD OF THE INVENTION

The present disclosure relates generally to electrochemical fuel cell systems, and more particularly to compression retention systems and end units for electrochemical fuel cell systems.

BACKGROUND OF THE INVENTION

The statements in this section merely provide background information related to the present disclosure and may not constitute prior art.

Fuel cells have been proposed as a clean, efficient and environmentally responsible power source for electric vehicles and various other applications. One example of a fuel cell is the Proton Exchange Membrane (PEM) fuel cell. The PEM fuel cell includes a membrane-electrode-assembly (MEA) that generally comprises a thin, solid polymer membrane-electrolyte having a catalyst and an electrode on both faces of the membrane-electrolyte.

The MEA generally comprises porous conductive materials, also known as gas diffusion media, which form the anode and cathode electrode layers. Fuel, such as hydrogen gas, is introduced at the anode where it reacts electrochemically in the presence of the catalyst to produce electrons and hydrogen cations. The electrons are conducted from the anode to the cathode through an electrical circuit connected therebetween. Simultaneously, the hydrogen cations pass through the electrolyte to the cathode where an oxidant, such as oxygen or air, reacts electrochemically in the presence of the electrolyte and catalyst to produce oxygen anions. The oxygen anions react with the hydrogen cations to form water as a reaction product.

The MEA is generally interposed between a pair of electrically conductive contact elements or separator plates to complete a single PEM fuel cell. Separator plates serve as current collectors for the anode and cathode, and have appropriate channels and openings formed therein for distributing the fuel cell's gaseous reactants (i.e., the $H_2$ & $O_2$/air) over the surfaces of the respective electrodes.

In practice, however, PEM fuel cells are not individually operated. Rather, PEM fuel cells are connected in series, or stacked one on top of the other, to form what is usually referred to as a fuel cell stack. PEM fuel cell stacks are generally loaded in compression in order to maintain low interfacial electrical contact resistance between the separator plates, the gas diffusion media, and the catalyst electrode. The low interfacial contact resistance in a PEM fuel cell stack is directly related to the compression loading. Typically, compression loads on the separator plate range from about 50 to about 400 psi and are controlled by a compression retention system. Importantly, such systems are often installed under an even higher building load to compensate for loss in compression that occurs when the building load is removed.

Compression retention systems are typically designed in a manner effective to offset strains produced by membrane swelling and compressive stress relaxation in the fuel cell stack. Such systems act to minimize an over-compression and damage of gas diffusion media in the fuel cell stack, as well as maintain the stack compression and contact pressure between separator plates, gas diffusion media, and catalyst layers. It is disclosed by Gibb et al. in U.S. Pat. No. 5,484,666 that conventional compression systems have consisted of tie rods extending through and between end plate assemblies secured with fastening nuts. Springs threaded on the tie rods and interposed between the fastening nuts and the end plates have been used to apply resilient compressive force to fuel cell stacks in the stacking direction.

In addition to compression retention systems, conventional PEM fuel cell assemblies include delivery subsystems for distribution of hydrogen fuel, oxidant and coolant to the fuel cell stack. For example, devices such as manifolds with ports for directing gases and fluids to the interior of the stack are common. Subsystems for exhausting reaction products and coolant are also generally present. Further found within fuel cell systems are current collectors, cell-to-cell seals, insulation, pumps, fans, valves, compressors, associated plumbing, electrical connections and instrumentation. Such subsystems and devices are volume consuming, can represent increased thermal mass when located outside the stack (requiring more time to warm the stack to appropriate temperatures), and in some cases can cause an electrically parasitic load on the fuel cell stack.

Peripheral preconditioning devices have also been necessary for optimum operation and performance of a fuel cell stack. Such systems can include, for example, reformers for extracting usable hydrogen fuel from hydrogen-containing feedstock. Additionally, humidifiers for wetting the PEM layers of the fuel cell stack and facilitating conduction of protons from the anode layers to the cathode layers of the MEA are often necessary. These peripheral devices require extensive additional hardware which can also lead to poor system efficiency. This poses problems in many applications, such as vehicular applications, where it is desirable that weight and size of a fuel cell system be minimized.

There is a continuing need for a fuel cell system that is volumetrically and thermally efficient, less massive, and integrates many of the aforementioned fuel cell subsystems, including compression retention systems. A method for manufacturing such fuel cell systems that minimizes loss in compressive force following a build is also desired.

SUMMARY OF THE INVENTION

In concordance with the instant disclosure, there is provided a fuel cell system comprising a fuel cell stack having a first end and second end. The stack has at least one fuel cell comprising a proton exchange membrane, an anode configured to accept a hydrogen-bearing reactant, a cathode configured to accept an oxygen-bearing reactant, a first separator plate having a plurality of reactant flowpaths, wherein the flowpaths are in communication with the anode, and a second separator plate having a plurality of reactant flowpaths, wherein the flowpaths are in communication with the cathode. The fuel cell stack further includes an upper end unit adjacent the first end of the fuel cell stack, a lower end unit adjacent the second end of the fuel cell stack, and a compression retention system disposed external to the fuel cell stack.

The compression retention system provided by the present disclosure is composed of at least one restraining member extending from the upper end unit to the lower end unit, the restraining member disposed outside of the fuel cell stack, fastening means disposed at opposite ends of said at least one restraining member, and compressive means interposed between at least one of said fastening means and the end units, wherein the fastening means and the compressive means urge the upper end unit toward the lower end unit, thereby applying compressive force to the fuel cell stack.

An end unit for a fuel cell system having a curved body is further described. The end unit provides a substantially uniform load to a fuel cell stack when compressive force is applied at the shoulder portions of the end unit body. The end unit, in particular embodiments, comprises a plastic or plastic composite material having a sheet metal outer layer stretched thereover.

A method for manufacturing a fuel cell system is further disclosed that first comprises providing a fuel cell stack, an upper end unit with a thin metal outer layer, a lower end unit adjacent the second end of the fuel cell stack, a compression retention system disposed external to the fuel cell stack. The method further includes applying a tensile load to at least one thin metal outer layer and a compressive load to the fuel cell stack, securing the restraining member to the upper and lower end units, and removing the loads from the at least one thin metal outer layer and the fuel cell stack to prepare the fuel cell system according to the invention.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
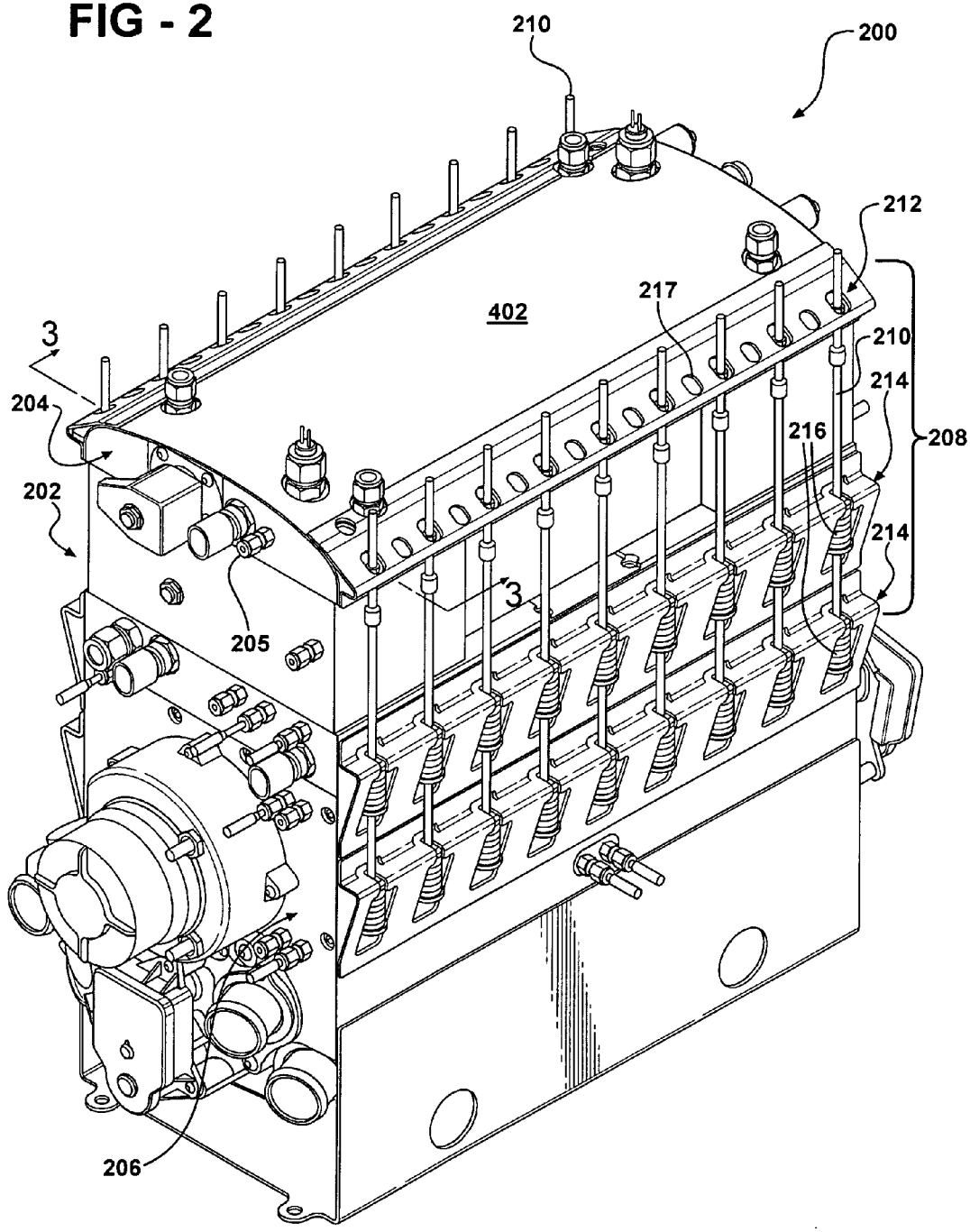
FIG. 2 is a perspective view showing a fully assembled fuel cell stack assembly with a compression retention system according to an embodiment of the invention.
Figure 3:
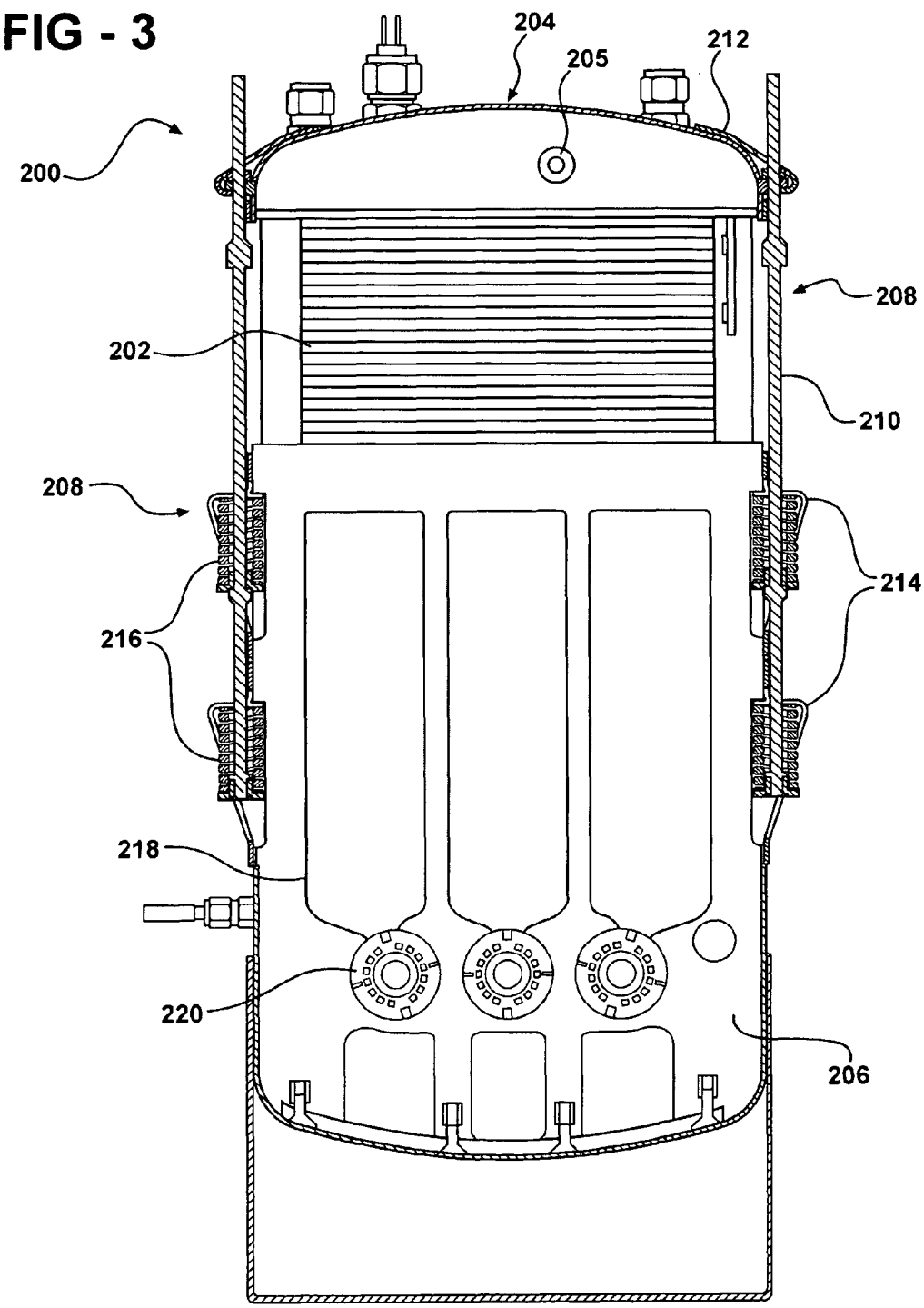
FIG. 3 is a cross-sectional view taken along line 3-3 of FIG. 2.
Figure 5:
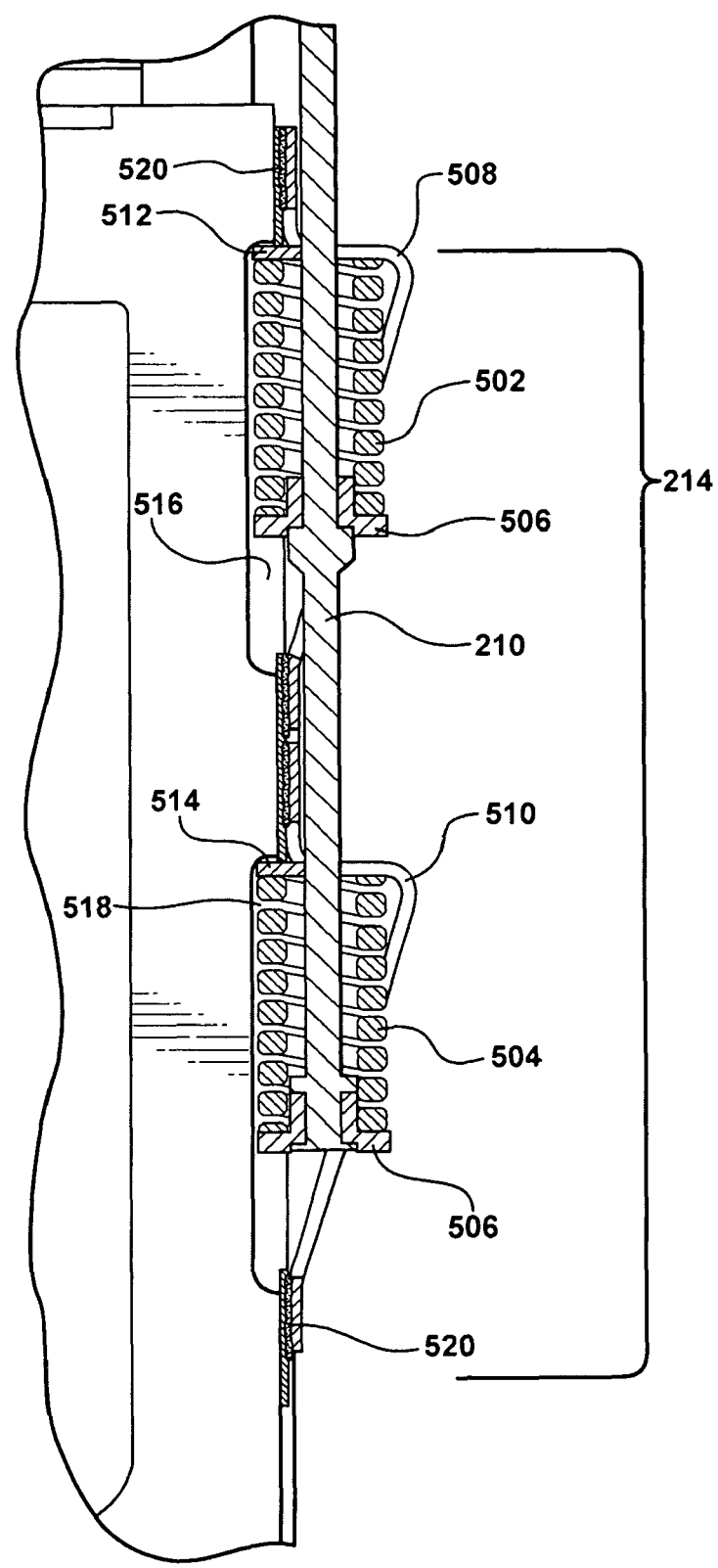
Figure 6:
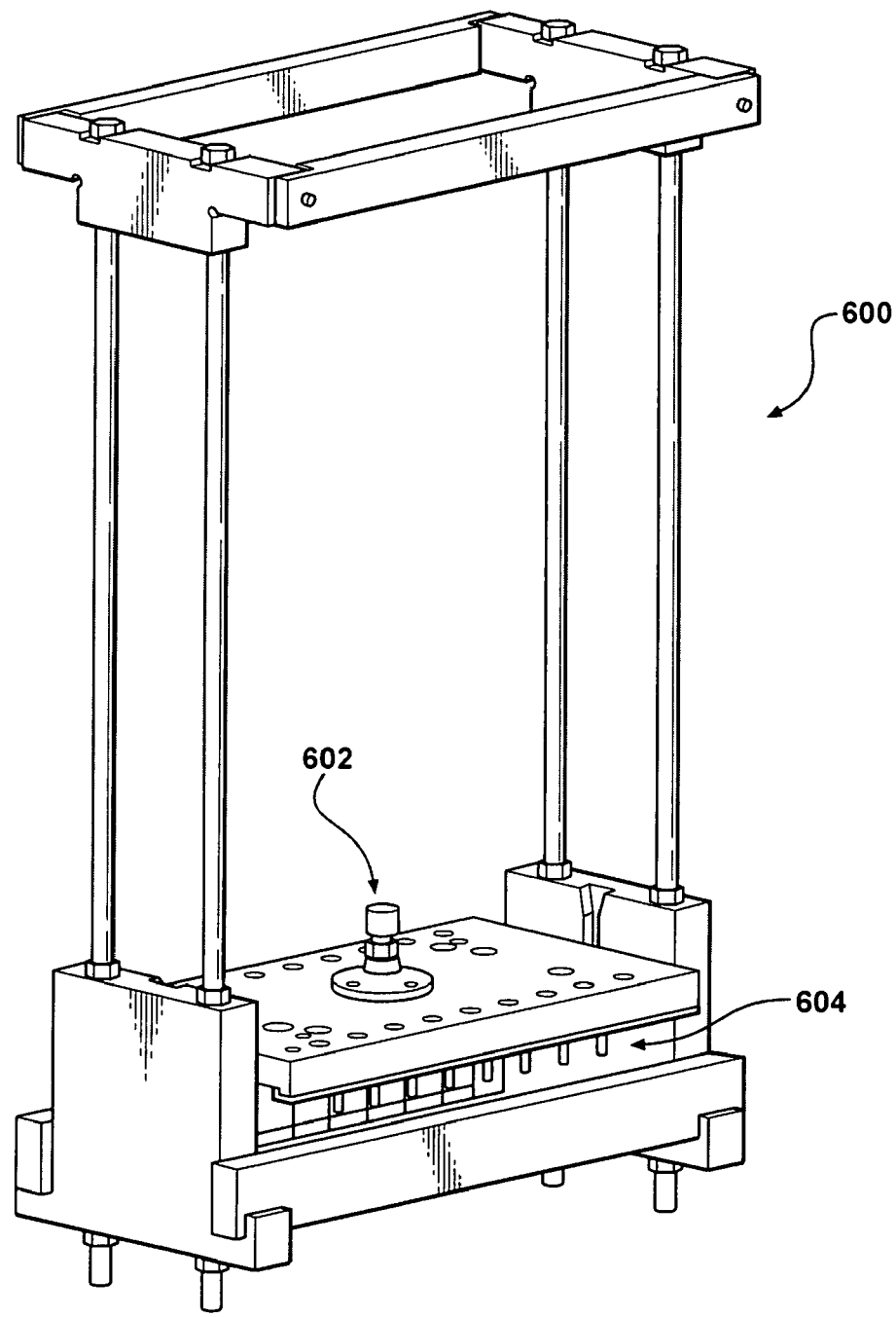
Figure 7:
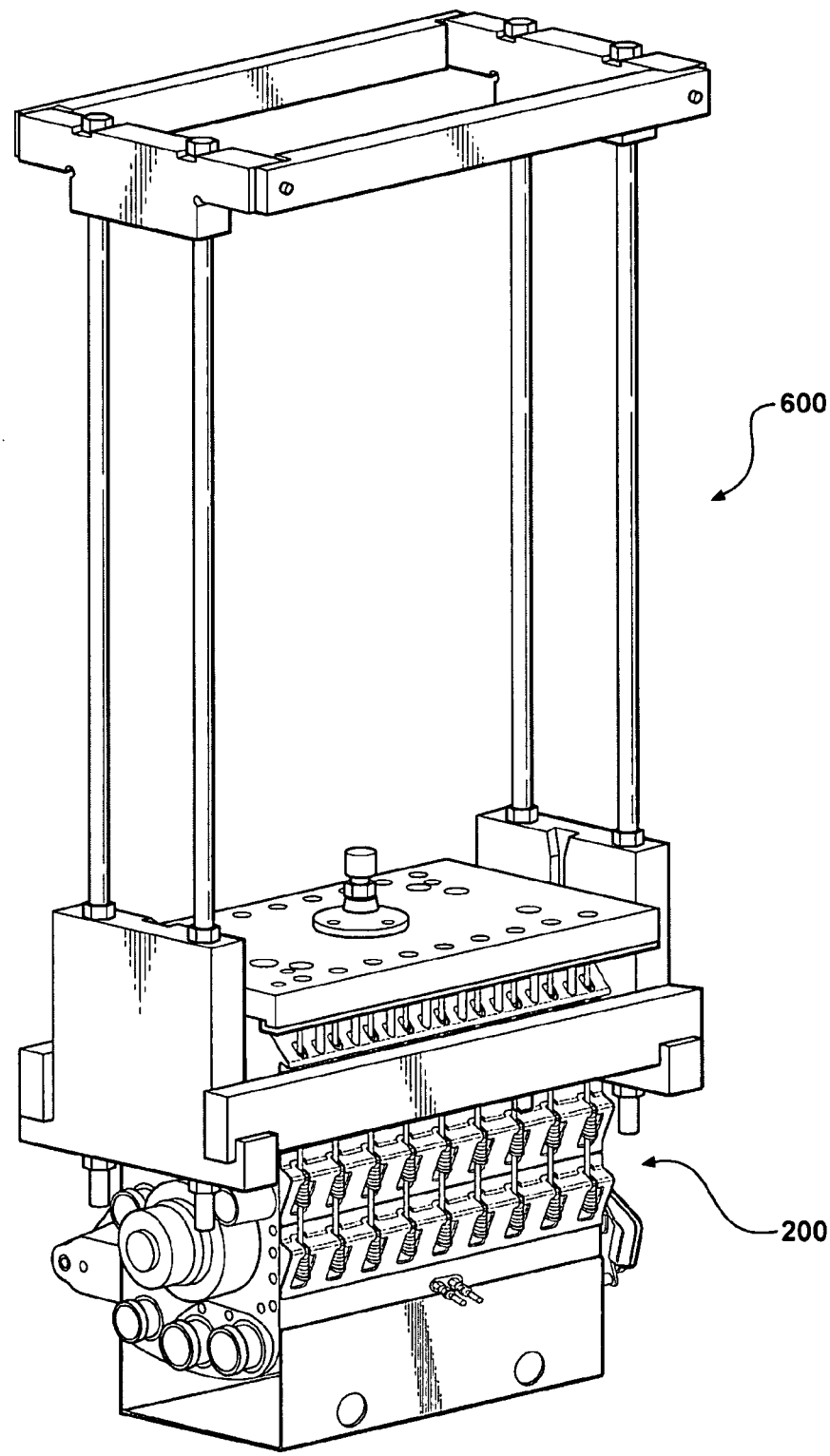

FIG. 5 is a fragmentary cross-sectional view of a lower end unit and the compression retention system illustrated in FIGS. 2 and 3; and FIG. 6 is a perspective view of compression tooling suitable for application of a compressive and tensile load to the upper end unit of the fuel cell stack assembly illustrated in FIGS. 2 and 3; and FIG. 7 is a perspective view of the fuel cell system illustrated in FIGS. 2 and 3 and the compression tooling illustrated in FIGS. 6 during assembly of the fuel cell system.

DETAILED DESCRIPTION OF THE INVENTION

The following description is merely exemplary in nature and is not intended to limit the present disclosure, application, or uses. It should be understood that throughout the drawings, corresponding reference numerals also indicate like or corresponding parts and features. In respect of the method disclosed, the steps presented are exemplary in nature, and thus, are not necessary or critical.

Figure 1:
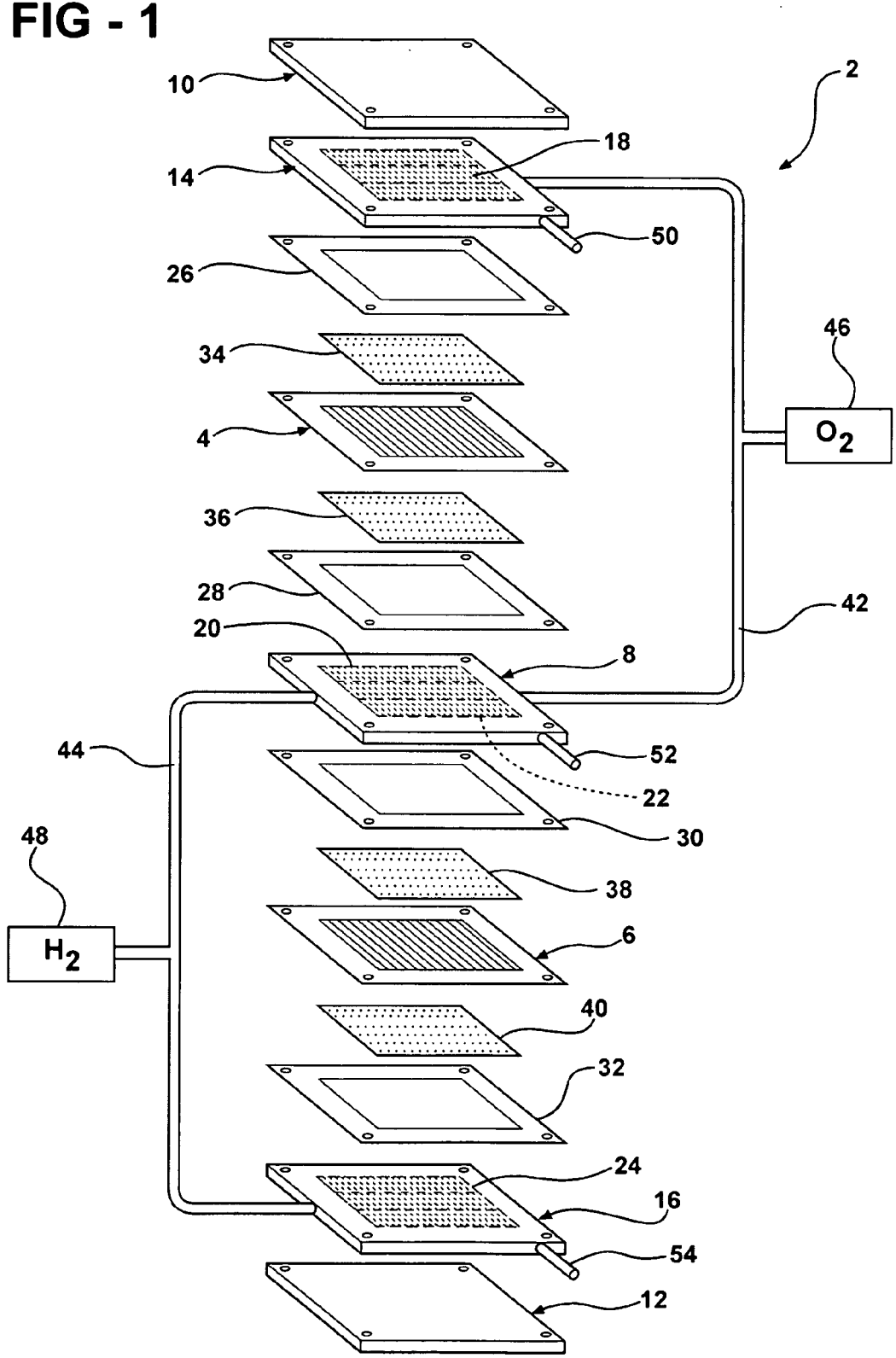
FIG. 1 illustrates a schematic, exploded perspective view of a PEM fuel cell stack (only two cells shown)

FIG. 1 depicts a two cell PEM fuel cell stack 2 having a pair of membrane-electrode-assemblies (MEAs) 4, 6 separated from each other by an electrically conductive fluid distribution element 8, hereinafter separator plate 8. The MEAs 4, 6 and separator plate 8, are stacked together between end plates 10, 12, and end contact elements 14, 16. The end contact element 14, both working faces of the separator plate 8, and the end contact element 16 contain a plurality of flowpath grooves or channels 18, 20, 22, 24, respectively, for distributing fuel and oxidant gases such as $H_2$ and $O_2$, for example, to the MEAs 4 and 6. Nonconductive gaskets 26, 28, 30, 32 provide seals and electrical insulation between components of the fuel cell stack 2.

Electrodes 34, 36, 38, 40 of the MEAs 4, 6 are typically formed by a gas permeable conductive material such as a carbon/graphite diffusion paper, for example. The electrodes 34, 36, 38, 40 are caused to press against the electrode faces of the MEAs 4, 6. The end contact elements 14, 16 are caused to press against the electrodes 34, 40 respectively, while the separator plate 8 is caused to press against the electrode 36 on an anode face of MEA 4, configured to accept an hydrogen-bearing reactant, and against electrode 38 on a cathode face of MEA 6, configured to accept an oxygen-bearing reactant. The oxygen-bearing reactant is supplied to a cathode side of the fuel cell stack 2 from a storage tank 46 by an appropriate supply conduit 42, while hydrogen-bearing reactant is supplied to an anode side of the fuel cell stack 2 from storage tank 48, by an appropriate supply conduit 44. Alternatively, ambient air may be supplied to the cathode side as an oxygen-bearing reactant and hydrogen to the anode side from a methanol or gasoline reformer, or the like. Exhaust plumbing (not shown) for both the anode and the cathode sides of the MEAs 4, 6 is also provided. Additional conduits 50, 52, 54 are provided for supplying a coolant to the separator plate 8 and the end plates 14, 16. Appropriate plumbing (not shown) for exhausting coolant from the separator plate 8 and the end plates 14, 16 is also provided.

It should be appreciated that even though particular embodiments disclosed herein describe fuel cell systems having PEM fuel cells, the invention of the disclosure may be applied to fuel cell systems utilizing other types of fuel cells, such as metal hydride fuel cells, phosphoric acid fuel cells, solid oxide fuel cells, electrogalvanic fuel cells, and alkaline fuel cells, for example.

Referring next to FIGS. 2 and 3, one embodiment of a fuel cell system 200 according to the present invention is shown. The fuel cell system 200 has a fuel cell stack 202 disposed between an upper end unit 204 and a lower end unit 206. A compressive force is applied to the fuel cell stack 202 by a compression retention system 208 having a plurality of restraining members 210, each of which extend from the upper end unit 204 to the lower end unit 206. The restraining member 210 is connected to the upper end unit 204 and the lower end unit 206 by respective fastening means 212, 214 at opposite ends of the restraining members 210.

In one embodiment, the restraining members 210 comprise a tie rod. The tie rod can be threaded or non-threaded, and may be chosen based on the fastening means 212, 214 selected. The fastening means 212, 214 secure the restraining member 210 to both the upper end unit 204 and the lower end unit 206 of the fuel cell assembly 200. In particular embodiments, the fastening means 212, 214 comprise bracket assemblies secured to the upper and lower end units 204, 206 of the fuel cell system 200.

The compression retention system 208 further comprises at least one compressive means 216. The compressive means 216 can include, as illustrative examples, one or more disc springs and/or coiled springs. Additional suitable springs can include planar springs, leaf springs, corrugated springs, and gas springs. The compressive means 216 may be stacked adjacent to one another or may be spaced apart as desired. The compressive means 216 may be formed integral with the restraining member 210 such as a tie rod having an incorporated spring portion, or separated therefrom. In one embodiment, the restraining member 210 is formed of a material inherently providing the compressive means 216 of the invention. As an illustrative example, the restraining member 210 or a portion thereof may be composed of a resilient material, for example an elastomeric material, which provides the desired compressive force.

The upper and lower end units 204, 206 house at least one, and in particular embodiments more than one, fuel cell subsystems and related devices (not shown) involved in preconditioning and operation of the fuel cell stack 202. As nonlimiting examples, the fuel cell subsystems housed within the upper and lower end units 204, 206 can include fluid passages, hydrogen fuel and oxidant ($O_2$/air) passages, cooling pumps, recirculation pumps, drainage valves, insulation, fans, compressors, valves, electrical connections, reformers, humidifiers, and related instrumentation. It should be recognized that additional fuel cell subsystems and/or peripheral devices used in support of the fuel cell system 200 can also be housed in the upper and lower end units 204, 206 of the disclosure.

Referring now to FIG. 3, one particular embodiment of a fuel cell system 200 according to the present invention is provided. The upper end unit 204 is integrated with a coolant bypass system 205 allowing coolant to recirculate through the fuel cell system 200 without passing through a heat exchange system. Advantageously, a passage for coolant flow may be formed directly into the body of the upper end unit. Additionally, the lower end unit 206 of the fuel cell system 200 is integrated with at least one water vapor transport unit 218, a heat exchanger 220, and related blowers (not shown), bypass valves (not shown) and coolant pumps (now shown). The integration of these and other subsystems into end units 204, 206 contributes to faster cold starts as the systems are heated more quickly due to a proximity to the fuel cell stack 202. Furthermore, integration results in faster re-starts as there is little to no external plumbing running outside of the fuel cell system, i.e there is less opportunity for heat energy transfer to occur. The integration of subsystems into the end units also eliminates the need for external housing and plumbing, thereby reducing the overall thermal mass of the system.

Figure 4:
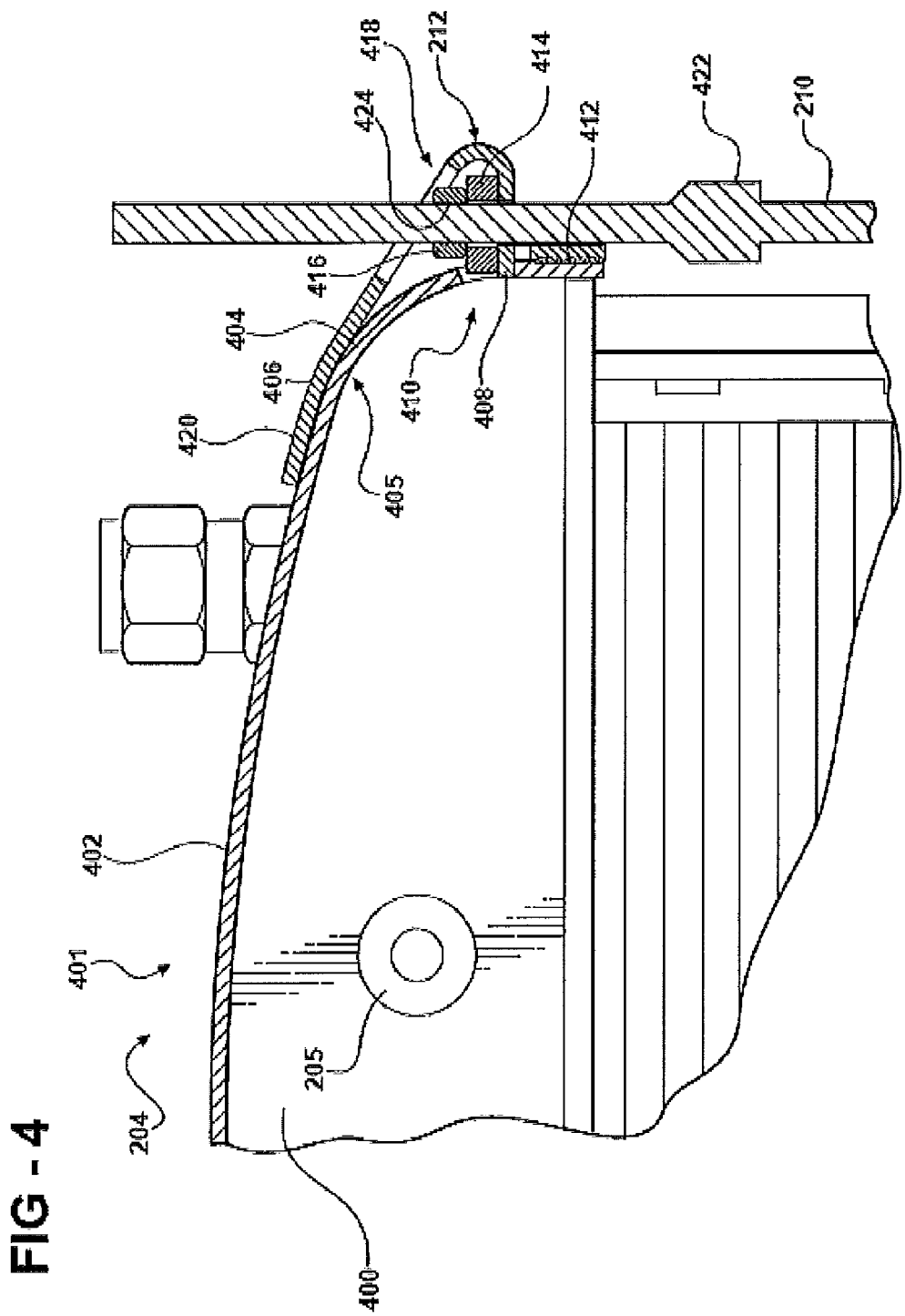
FIG. 4 is a fragmentary cross-sectional view of an upper end unit of the fuel cell stack assembly illustrated in FIGS. 2 and 3.

FIG. 4 shows an upper end unit 204 having a body 400 covered by a thin layer of material 402. The body 400 of the upper end unit 204 can be suitably formed from metal, metal alloys, or plastic or plastic composite materials. Illustratively, the plastic or plastic composite material comprises a high performance plastic. The high performance plastic can be selected from, as nonlimiting examples, polyether ether ketones (PEEK), polyether sulfones (PES), polyphenyl sulfones (PPSU), polysulfones (PSU), polysuper sulfones (PSS), polyphthalamides (PPA), polyaryl amides (PAA), poly amide imides (PAI), poly ether imides (PEI), ultra-high molecular weight polyethylenes (UHMWPE), and combinations thereof. The plastic or plastic composite material may further comprise one or more reinforcing fillers. Suitable reinforcing fillers include, as nonlimiting examples, coated or uncoated polyester fibers, aramid fibers, aramid pulp, carbon fibers, carbon black powder, graphite powder, metal powder, metal fibers, glass fibers, glass powder, hollow glass spheres, and combinations thereof. Conventional additives for plastics compounds may also be included in the described plastic or plastic composite materials. Nonlimiting examples of conventional additives include non-reinforcing fillers (e.g., calcium carbonate, silica), plasticizers, antidegradents (e.g. antioxidants, antiozonants, UV absorbers), pigments and colorants, and processing aids. One of skill in the art should recognize that suitable plastic or plastic composite materials are chosen based on rigidity, temperature resistance, chemical resistance, and dimensional stability. For example, suitable plastic or plastic composite materials do not swell significantly when exposed to water, nor degrade significantly with exposure to temperatures associated with typical operation of fuel cell stacks. It should also be appreciated that suitable plastic materials do not contain materials that leach or migrate significantly from the material and into the fuel cell stack. It should further be appreciated that end units comprising plastic or plastic composite materials may insulate the fuel cell stack and integrated subsystems.

In a further illustrative embodiment, the outer layer 402 covering the body 400 of the upper end unit 204 may comprise a thin layer of metal. In a nonlimiting example, the thin layer of metal comprises sheet metal. Particular examples of suitable sheet metals include aluminum, brass, copper, steel, tin, nickel, titanium, and alloys thereof. In certain embodiments, steel sheet metal is stretched over the body 400 of the upper end unit 204 after formation of the unit body 400, e.g. via molding, to form the outer layer 402. In such an embodiment, a tension or tensile load is imparted to the thin layer of metal 402 covering the body 400 of the upper end unit 204.

It should be recognized that sheet metal is available in a variety of gauges which are suitable for the thin layer of metal of the present invention. As nonlimiting examples, suitable sheet metal gauges can range from about 30 gauge (0.0157 inches) to about 8 gauge. (0.161 inches). In particular embodiments, the thickness of the thin layer of sheet metal is less than about 26 gauge (0.0217 inches). It is understood, however, that sheet metal of other thickness can be used as desired and depending on the stress applied to the sheet metal.

The upper and lower end units 204, 206 of the present invention are generally square or rectangular in shape, although it should be appreciated that other shapes are also suitable. In the embodiment shown, the end units 204, 206 have a curvature sufficient to transform the tensile load of the sheet metal into a substantially uniform compressive stress across the fuel cell stack 202 when a compressive force is applied by the compression retention system 208. As a nonlimiting example, the curvature of an end unit may be defined by a single radius, for instance an end unit being a half sphere. The overall curvature of the end units 204, 206 can also be defined by a body portion 400 having a first radius $r_1$ 401 and a pair of spaced apart shoulder portions 404 having a second and third radii $r_2$ 405 and $r_3$ (not shown). It should be appreciated that the radii are dependant upon the width and thickness of the end unit, as well as the overall height available for the fuel cell system, and can be selected as desired. In particular instances, the second radius $r_2$ is about equal to third radius $r_3$. The curvature may also have further intermediate or transitional radii and may comprise surfaces not characterizable by radii, e.g. gradual or continuous sloping surfaces.

The radius defining the curvature of the body portion 400 can generally be from about 1 to about 2 times the width of the fuel cell stack. In particular instances, the body portion radius $r_1$ can be about 1.5 times the width of the stack. Furthermore, the $r_2$ and $r_3$ defining the curvature of shoulder portions 404 typically may be from about 0.25 to about 0.75 the thickness or height of the end unit. In particular instances, the $r_2$ and $r_3$ are about 0.5 times the thickness or height of the end unit. It is understood that other radii can be used as desired to define the curvature of the body 400 and shoulder 404 portions of the upper end unit 204.

In particular embodiments, end units 204, 206 have an $r_1$ from about 200 mm and about 400 mm and an $r_2$ and $r_3$ from about 10 mm and about 30 mm, wherein the curvature provides a substantially uniform stress across the fuel cell stack when compressive force is applied by a compression retention system 208 according to the present invention. In a further embodiment, the curvature of either end unit can be defined by an $r_1$ of about 320 mm and an $r_2$ and $r_3$ of about 20 mm.

It should be recognized by one of skill in the art that the aforementioned structure, material composition, and curvature of the upper end unit may be applied equally to the lower end unit of the invention.

FIG. 4 further illustrates a bracket 406 secured to the upper end unit 204. The bracket 406 includes a tab 408 that is communication with a slot 410 present in the outer layer 402 of the upper end unit 204. The bracket 406 may be held in place by welds 412 if desired. A compressive force provided by the compression retention system 208 is transferred to the end units 204, 206 by the end unit bracket tabs 408 in communication with the unit slots 410 of the outer layer 402.

It should be understood that, in particular embodiments, the compressive means 216 does not provide a substantial bending moment to the thin metal outer layer 402. As a nonlimiting example, at least a portion of the compressive means 216 can be essentially in-line with the thin metal outer layer 402. It should be appreciated that being essentially in-line with the thin metal layer means that the compressive means 216 can be offset slightly and yet function to provide no substantial bending moment to the metal outer layer 402. One of skill in the art should further appreciate that the compressive means 216, if disposed substantially out-of-line with the thin metal outer layer 402, can result in an undesirable bending moment on the metal outer layer 402.

Also depicted in FIG. 4 is a cantilever 420 from bracket 406. Bracket cantilever 420 is a stiff member extending outwardly from the bracket 406 and is disposed adjacent outer layer 402. The cantilever 420 further allows restraining member 210 to transfer load to upper end unit 204 and outer layer 402. It is understood that cantilever 420 can be welded to outer layer 402.

In addition to the fastening bracket 406 shown in FIG. 4 is a reinforcing bar 414 interposed within the bracket 406 and specifically between the tab 408 and a nut 416. In the embodiment shown, the bracket 406 has at least one opening 418 formed therein to receive the restraining member 210. Under tension, the restraining member 210 can be secured to the bracket 406 by tightening of the nut 416 on a threaded portion 424 of the restraining means 210. It is understood that restraining member 210 can also be secured by weld 412.

As shown in FIG. 5, a further view of the compression retention system 208 is provided. The restraining member 210 includes a pair of springs 502, 504 disposed thereon. The springs 502, 504 substantially surround the restraining member 210 and are securely disposed between projections or abutment portions 506 of the restraining member 210 and lower end unit brackets 508, 510. The lower end unit brackets 508, 510 are affixed or secured to the lower end unit 206. The brackets 508, 510 have a tab 512, 514 that is in communication with a lip 516, 518 formed in the lower end unit 206. It is understood that the lower end unit brackets 508, 510 can be welded, for example with a weld 520, or otherwise secured to the lower end unit 206.

The present invention further includes a method for manufacturing a fuel cell system according to the present disclosure. The method comprises first providing the fuel cell stack 202, at least one end unit 206 having the thin metal outer layer 402, and the compression retention system 208 according to the present invention. A load is then applied to the metal outer layer 402 of the end unit 204 and to the fuel cell stack 202. In particular embodiments the load is the same for both the outer layer 402 and the fuel cells stack 202. In further embodiments, a different load is applied to the outer layer 402 than is applied to the fuel cell stack 202. In general, the load applied to the thin metal outer layer 402 is a tensile load and the load applied to the fuel cell stack 202 is a compressive load.

Following the application of the load to the thin metal outer layer 402 and the fuel cell stack 202, the restraining member of the compression retention system 208 is secured to at least one of the end units 204, 206. As a nonlimiting example, the restraining member 210 having the threaded portion 424 is secured to the upper end unit 204 via a bracket 406 and a nut 416, the nut 416 being tightened to securely fix the restraining member 210 in place. The restraining member 210, fastening means 212, 214, compressive means 216, and outer layer 402 are thereby placed in tension and, in cooperation with the slot 410 and lips 512/514, maintain the compression of the fuel cell stack 202. It should be appreciated that in such an instance, due to the compressive load applied to the fuel cell stack 202, that the restraining member 210 need only be secured by a nut 416 at one end of the restraining member 210. In a further embodiment, the restraining member 210 may be secured by other means, such as a by weld, a snap ring, or a clamp, for example.

After the compression retention system 208 is secured in place, the load may be removed from both the thin metal outer layer 402 and the fuel cell stack 202. A fuel cell system 200 is thereby prepared wherein the fastening means 212, 214 and the compressive means 216 urge the upper end unit 204 toward the lower end unit 206 of the fuel cell system 200 and maintain a compressive force on the fuel cell stack 202.

In the embodiments, the compressive load placed on the fuel cell stack is from about 3 tons to about 8 tons, and more particularly about 5.5 tons. However, it is understood that other compressive loads can be used.

It should be appreciated that, in practicing the present method, loss of compressive force is minimized after the compressive load is removed from the fuel cell stack 202. In particular embodiments, there is substantially no loss in compressive force after the compressive load is removed. Accordingly, the need to apply higher compressive loads conventionally used to compensate for stretch in the compression retention system after a building load is minimized. Compressive loads used during build or manufacture of the fuel cell stack 202 can therefore be minimized, thus militating against unnecessary compression and/or damage to the PEM and MEAs 4,6 of the fuel cell stack 202.

Referring now to FIGS. 6 and 7, the method of the present invention may be practiced with compression tooling 600. For example, a hydraulic press 602 outfitted with one or more posts 604 for communication with the bracket 406 secured to the thin metal outer layer 402 on the upper end unit 204 provides a tensile load on the thin metal outer layer 402 as well as a compressive load on the fuel cell stack 202. Additionally, the contact of the press 602 with the upper end unit 204 can also result in a compressive load on the fuel cell stack 202. The restraining members 210 of the compression retention system 208 are held, in particular instances by a widened portion 422 of restraining member 210, while the load is applied to the upper end unit 204. After the restraining members 210 are secured and the load from the hydraulic press 602 removed, it has surprisingly been found that the tension in the metal outer layer of the upper end unit at least partially compensates for stretching that occurs in the restraining members 210, thereby maintaining compressive load as applied during the build.

With renewed reference to the compression retention system 208 of the present disclosure, it should be appreciated that the compression retention system 208 is disposed external to the fuel cell stack 202, i.e. the restraining member 210, fastening means 212, 214 and compressive means 216 are located outside of the body of the fuel cell stack 202. Advantageously, the compression retention system 208 of the invention, being located outside of the fuel cell stack 202, does not act as a thermal mass during the initial warming of the stack 202 to optimum operating temperatures.

Furthermore, as the fastening means 212, 214 of the present invention does not extend through the end units 204, 206, it should be appreciated that the overall height of the resulting fuel cell system is minimized. The use of threaded restraining means 210 also facilitate various fuel cell stack 202 heights. Furthermore, the location of individual compressive means 216 with respect to fuel cell end units 204, 206 can also be controlled such that bending moments in the end units 204, 206 are minimized. This allows for design of fuel cell systems 200 with thinner sheet metal, again providing lower overall mass and volume.

It should also be understood that the compression retention system 208 of the present disclosure is flexible or adaptable in that the spring rate of the system 208 can be adjusted to provide a wide range of load deflection curves. The system is also adaptable in that the location of individual compressive means 216 can be adjusted to accommodate a wide array of fuel cell stack 202 designs.

With renewed reference to the end units 204, 206 disclosed herein, faster cold starts of the fuel cell system 202 are now realized by housing or integrating fuel cell subsystem into the end units 204, 206 of the fuel cell system 200. Previous systems using discrete subsystem components, e.g. air cooler and humidifier components, which are mostly surrounded by ambient air and exposed to underhood air flows (in automobile applications) transfer heat out of the system 200 and inhibit cold starts. Integrated end units 204, 206 as disclosed herein also remain warm for a longer period after fuel cell shutdown, reducing the extent of a cold start over a usage cycle.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fuel cell system comprising:
   a fuel cell stack having a first end and second end, the stack comprising at least one fuel cell;
   an upper end unit disposed adjacent the first end of the fuel cell stack, the upper end unit having an outer layer disposed across an upper surface of a body of the upper end unit;
   a lower end unit disposed adjacent the second end of the fuel cell stack; and
   a compression retention system disposed external to the fuel cell stack, the compression retention system comprising at least one restraining member extending from the upper end unit to the lower end unit, a first fastening means and a second fastening means disposed at opposing ends of the at least one restraining member, the first fastening means coupling the at least one restraining member with the outer layer on the upper end unit, and the second fastening means coupling the at least one restraining member with the lower end unit, and compressive means interposed between the second fastening means and an abutment portion of the at least one restraining member,
   wherein the first fastening means, the second fastening means, the at least one restraining member, and the compressive means place the outer layer on the upper end unit under tension, and urge the upper end unit toward the lower end unit, thereby applying compressive force to the fuel cell stack.

2. The fuel cell system of claim 1, wherein the outer layer is a thin metal sheet.

3. The fuel cell system of claim 2, wherein the upper and lower end units are curved to transform the tensile load of the sheet metal into a substantially uniform compressive load across the fuel cell stack when a compressive force is applied by the compression retention system.

4. The fuel cell system of claim 1, wherein the at least one restraining member is a tie rod.

5. The fuel cell system of claim 1, wherein the fastening means comprises brackets secured to the upper and lower end units.

6. The fuel cell system of claim 5, wherein the brackets comprise a tab in communication with one or more slots formed in the upper end and lower end units.

7. The fuel cell system of claim 6, wherein the tab transfers a substantial portion of the compressive force applied by the compression retention system to the fuel cell stack.

8. The fuel cell system of claim 1, wherein the compressive means comprises a coiled spring.

9. The fuel cell system of claim 1, wherein the compressive means does not provide a substantial bending moment in the outer layer.

10. The fuel cell system of claim 9, the upper or lower end units having one or more slots formed therein, wherein the compressive means is disposed within the one or more slots and is substantially in line with the thin sheet metal outer layer.

* * * * *